May 19, 1959 H. W. KUGLER 2,886,965
RESONANT MOUNTING

Filed Feb. 25, 1957 2 Sheets-Sheet 2

INVENTOR.
HERBERT W. KUGLER
BY
D. Gordon Angus
ATTORNEY.

United States Patent Office 2,886,965
Patented May 19, 1959

2,886,965

RESONANT MOUNTING

Herbert W. Kugler, deceased, late of Sierra Madre, Calif., by Herbert M. Kugler, administrator, Oakland, Calif., assignor to Aerojet-General Corporation, Azusa, Calif., a corporation of Ohio Application February 25, 1957, Serial No. 642,002

8 Claims. (Cl. 73—71.6)

This invention relates to vibration fatigue test systems and more particularly to resonant support mechanisms adapted to be vibrated by a vibration exciter.

An object of this invention is to provide such a support mechanism that will be continuously adjustable for a range of both frequency and load.

Another object is to provide such a support mechanism which is light and inexpensive.

A further object is to provide a support mechanism that will have low dampening and permit the use of a relatively low power vibration exciter.

When it is necessary to make vibration fatigue tests on objects of considerable weight over a wide range of frequency and acceleration, the vibration exciting source becomes very large and expensive unless some type of resonant support system is used. Cantilever and other beam systems, which can be set for resonance by adjustable supports or weights, have heretofore been used and found satisfactory for light objects. But for heavy objects beam systems have been found unsatisfactory because they become unwieldy and are difficult and slow to adjust for frequency changes.

The invention is carried out by provision of a chamber or cylinder closed at both ends by adjustable cylinder stops or pistons. A free-floating piston within the chamber or cylinder carries a load support. The space in the cylinder on both sides of the free-floating piston is filled with fluid which maintains the piston freely floating. Application of a vibratory force to the free-floating piston or load support, serves to put this support in vibration.

A feature of the arrangement resides in adjusting the spacing of the cylinder stops or pistons from the free-floating piston by the proper amount to produce a condition of resonance. When the condition of resonance is attained, there is relatively great amplitude of vibration with relatively little vibratory force required.

These and other features of my invention will be clearly understood from the following description and drawings, of which:

Figure 1:
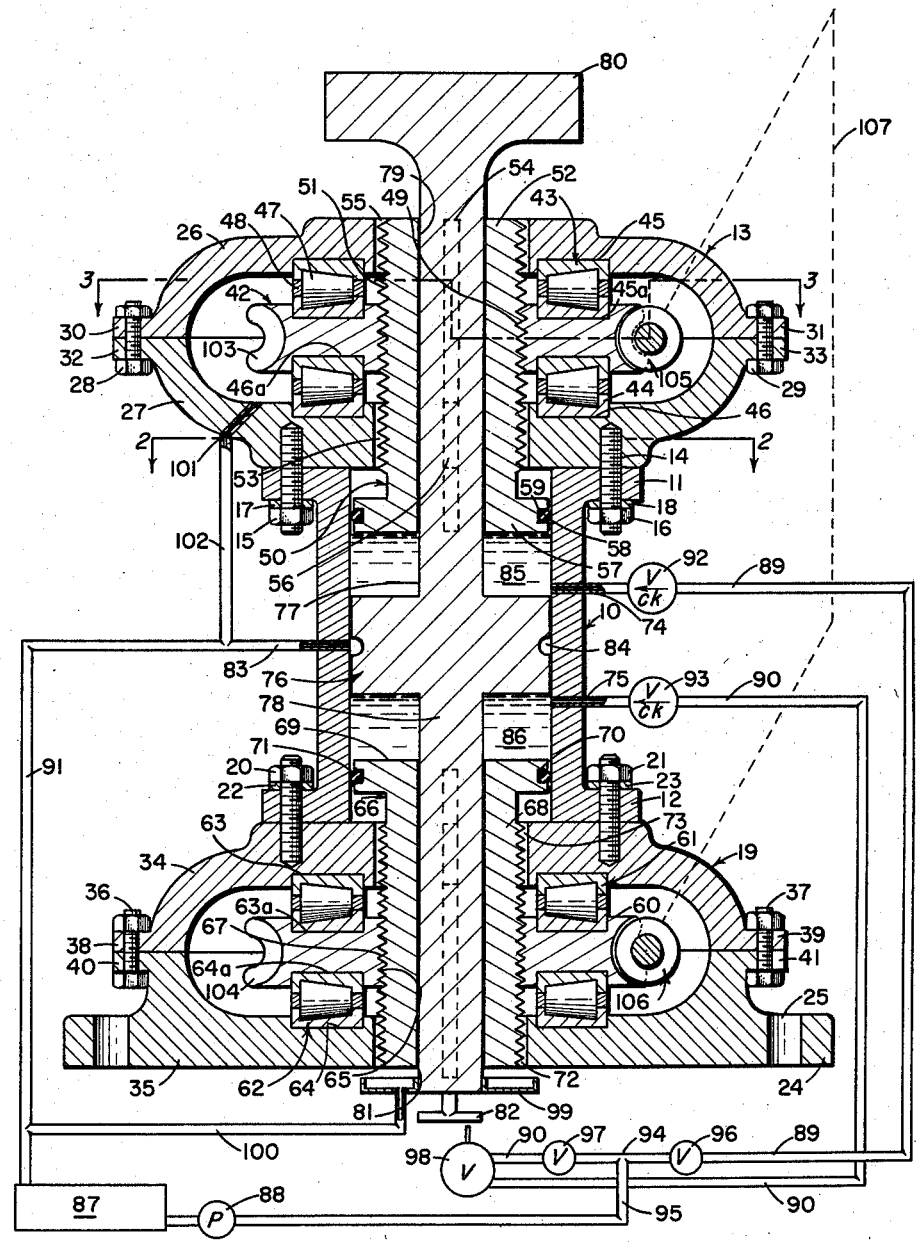
Fig. 1 is a side view in cross section of a device according to this invention.

In Fig. 1 there is shown a cylinder 10 which has flanged ends 11 and 12. The upper flanged end 11 is attached to an upper support yoke 13 by means of uniformly spaced holes 14, shown in Fig. 2, in the upper support yoke aligned with holes in the upper flanged end 11. Bolts, such as the bolts 15 and 16 shown in Fig. 1, extend into the upper support yoke holes 14 through the aligned holes in the upper flange 11. Lock washers 17 and 18 are shown on bolts 15 and 16 respectively and similar lock washers are used on each of the bolts to prevent loosening of the upper support yoke from the cylinder. The lower flanged end 12 is attached to a lower support yoke 19 in a similar manner as the attachment of the cylinder to the upper support yoke. Of the number of uniformly spaced bolts attaching the lower support yoke, only two bolts 20 and 21 with their respective lock washers 22 and 23 are shown in Fig. 1. The lower support yoke has a flanged base 24 provided with holes 25 so that the device can be secured to a supporting base structure by means of bolts or the like.

The upper support yoke 13 and the lower support yoke 19 are each of a hollow half toroid form, and each of the upper and lower yokes has a U-shaped cross section with the open part of the U directed inward. The upper support yoke 13 is comprised of an upper half 26 and a lower half 27 which are held together by bolts 28 and 29 which are located through holes in flanges 30 and 31 on the upper part of support yoke 13 and through holes in flanges 32 and 33 on the lower part of support yoke 13.

The lower support yoke 19 is also comprised of an upper half 34 and a lower half 35 which are held together by bolts 36 and 37 located through holes in flanges 38 and 39 on the upper part of support yoke 19 and through holes in flanges 40 and 41 on the lower part of support yoke 19.

Figure 3:
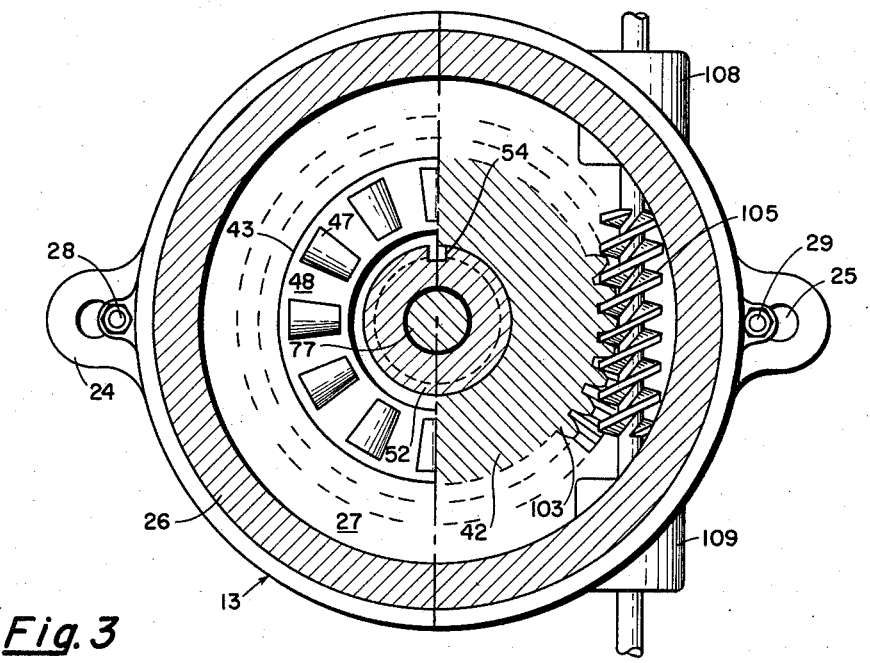
Fig. 3 is a cross-section view taken at line 3—3 in Fig. 1.

Within the U of upper support yoke there is a nut 42 mounted between two tapered roller bearing assemblies 43 and 44. The roller bearing assembly 43 lies in circular grooves 45 and 45a in the upper part of yoke 13. The roller bearing assembly 44 lies in circular grooves 46 and 46a in the lower part of yoke 13. The tapered roller bearing assembly 43 is shown best in Fig. 3 in a position above nut 42, centrally located on nut 42. The tapered bearings 47 are separated in a conventional manner by spacers 48 as shown in Fig. 3.

Figure 2:
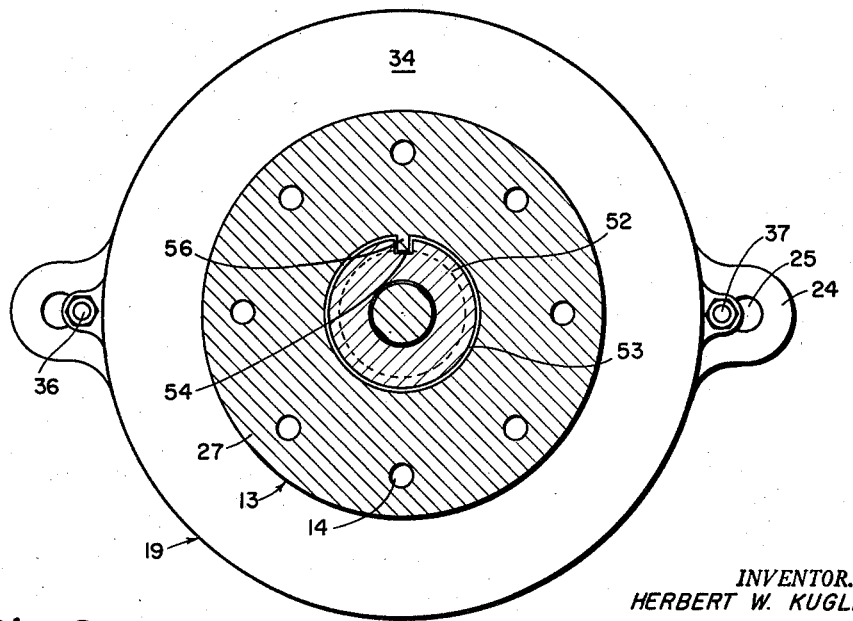
Fig. 2 is a cross-section view taken at line 2—2 in Fig. 1.

Internal threads 49 on the nut 42 support a hollow piston 50 by means of corresponding external threads 51 on the periphery of a shank 52 on piston 50. The threaded piston shank 52 is of a small enough diameter to clear the center hole 53 formed in the lower part 27 of the upper support yoke 13 as shown in Fig. 2. Also shown in Fig. 2 and Fig. 3 is a longitudinal external slot 54 on the piston shank 52 in a position parallel to the axial direction, of the piston 50. The piston shank 52 also clears the center hole 55 in the upper part 26 of the support yoke 13. The lower half 27 of the upper support yoke 13 has a protruding vertical guide 56, as shown in Fig. 2, around which the external slot 54 of the piston shank slides. Turning the nut 42 causes the piston shank 52 to move up or down on nut threads 49 since the shank 52 cannot rotate with the nut 42, because of the slot 54 and the vertical guide 56. The hollow piston 50 has a piston head 57 provided with a peripheral packing ring 58 which fits in a piston ring groove 59, and thus provides a tight fit between the cylinder 10 and the upper hollow piston 50. The lower support yoke 19 is also provided with a nut 60 mounted between roller bearing assemblies 61 and 62. The bearing assembly 61 lies in circular grooves 63 and 63a in the upper part of the yoke 19 and the bearing assembly 62 lies in grooves 64 and 64a in the lower part of the yoke 19.

Internal threads 65 on the nut 60 support a hollow piston 66 by means of corresponding threads 67 on the periphery of a shank 68 on the piston 66. The piston 66 also has a piston head 69 which has a piston ring groove 70 and peripheral packing ring 71. The upper yoke 13 and the lower yoke 19 are similar to one another, the lower yoke 19 has a center hole 72 in the lower part 35 and a center hole 73 in the upper part 34. The center hole 73 also has a protruding vertical guide around which a longitudinal slot on the piston shank 68 slides in an arrangement similar to the protruding vertical guide 56 and the longitudinal slot 54. The guide and slot in the lower support yoke and piston assembly are similar to the guide 56 and the slot 54 as shown in Figs. 2 and 3. The lower support yoke piston assembly and upper support yoke piston assembly are identical with each other with the exception that the lower support yoke has the flanged base 24 provided with holes 25 which are omitted on the upper support yoke since they are not necessary.

In the wall of the cylinder 10 there are two ports 74 and 75 separated from one another and positioned near the longitudinal mid-point of the cylinder wall. The port 74 is located the same distance from the upper end of cylinder 10 as the port 75 is located from the lower end of cylinder 10.

A floating piston 76 is provided with a rigid upper piston rod 77 and a rigid lower piston rod 78. The upper piston rod 77 extends through a hollow central portion 79 of the upper piston 50 in a packless but floating close fit. The upper end of the piston rod 77 is a load-supporting surface 80. The lower piston rod 78 extends through a hollow central portion 81 of the lower piston 66 in a packless but floating close fit. The lower end of the lower piston rod 78 is provided with a circular contact extension 82, which is threaded into a tapped hole in the end of lower piston rod 78.

The cylinder 10 has another port 83 located on the cylinder wall at equal distances from either end of the cylinder. The floating piston 76 is of sufficient thickness so that it barely fits between the ports 74 and 75. The floating piston 76 is provided with a peripheral groove 84 which is located at the mid-point of the piston side. The peripheral groove 84 is always in communication with the port 83 no matter which way the piston 76 turns.

The cylinder chambers 85 and 86 on the upper end and lower side respectively of the piston 76 are filled with a fluid, such as water or oil, through ports 74 and 75 respectively from a sump 87 by means of a pump 88 and supply tubes 89 and 90. The port 83 removes fluid, which leaks around the free floating packless piston 76 from chambers 85 and 86, and returns it by means of tube 91 to the sump 87. Check valves 92 and 93 are provided in supply tubes 89 and 90 respectively to prevent return flow of fluid through tubes 89 and 90. Supply tubes 89 and 90 are provided at a junction 94 with a common supply tube 95 which comes from the pump 88. Supply tube 89 is provided with a pressure regulator valve 96 by which pressure may be regulated in cylinder chamber 85 and supply tube 90 is provided with a pressure regulator valve 97 by which pressure may be regulated in cylinder chamber 86. The piston rod contact extension 82 actuates a valve 98 which is between regulator valve 97 and check valve 93 in supply tube 90 connected to chamber 86.

A drain pan 99 which is welded to the periphery of the lower piston rod 78 catches fluid which leaks around the inside and outside of lower hollow piston 66 and returns the leakage fluid to the sump 87 by means of a flexible drain tube 100. A port 101 in the lower portion 27 of the upper support yoke 13 drains fluid which leaks to the interior of the upper support yoke from around the inside and outside of the upper hollow piston 50. The port 101 drains to a drain tube 102 connected to the return tube 91 which in turn is connected to the sump 87.

The nut 42 within the upper support yoke 13 and the nut 60 within the lower support yoke 19 are provided with peripheral gear teeth 103 and 104 respectively which are driven by worms 105 and 106 respectively. The nuts 42 and 60 are adapted to advance or retract the pistons 50 and 66 simultaneously equal distances toward or away from the floating piston 76 by means of worms 105 and 106 which are preferably interconnected so that they rotate in opposite directions in unison. This can be done by a suitable uni-control arrangement represented schematically by the broken lines 107 shown in Fig. 1.

The worm 105 is shown in Fig. 3 in contact with the peripheral gear teeth 103 on the nut 42. The worm 105 is mounted in two ball bearing assemblies 108 and 109, one located around the worm at each position where the worm 105 passes through a hole provided in upper support yoke 13 between its upper half 26 and its lower half 27.

*Operation*

The device is made ready for use by setting the cylinder end piston 50 and the cylinder end piston 66 each at some equal distance from the longitudinal central position of the cylinder 10.

The piston 76 is then floated so that it is centrally located longitudinally in the cylinder 10 between the end piston 50 and the end piston 66 while the load supporting surface 80 is being loaded with an object to be tested in a fatigue test. To float the piston 76 while the load is on the platform, the space in the cylinder 10 between the piston 50 and the piston 66 is filled with fluid supplied through supply tubes 89 and 90 which are kept under pressure by the pump 88.

The fluid pressure on the bottom side of the piston 76 is regulated by the valve 97 to that required by the load being supported, until the entire weight of the test object is supported. At the same time, pressure on the top side of piston 76 is regulated to a proper value, which is relatively low compared to the fluid pressure on the bottom side, by the valve 96 so that the piston 76 is centrally supported in the cylinder 10. The fluid pressures on the two sides of piston 76 are maintained at suitable values which will centrally support the piston 76 and the load which is on the surface 80, and the pressures that are maintained are also of such values so that leakage around the floating piston 76 and the rods 77 and 78 is compensated for by fluid supplied through the tubes 89 and 90. The pump 88 is of sufficient capacity to take care of the leakage around the floating piston 76 and the rods 77 and 78.

The test object on surface 80 is to be vibrated a certain number of cycles per second to test the resistance to fatigue of the materials of the test object, resulting from vibration. To test an object, such as a car frame, after it has been placed on the load supporting surface 80, a vibration exciter which may, for example, comprise a rotating eccentric device placed or arranged on or in contact with the platform 80 thereby causing the rod 77, the piston 76 and the rod 78 to move or vibrate correspondingly.

No particular vibration exciter is shown or described here as it is a well known type of device and not any part of this invention.

The frequency of the vibration exciter should be the desired resonant frequency of the support mechanism. To cause the support mechanism device to resonate at the frequency of the vibration exciter, the chambers 85 and 86 should be made suitable equal lengths.

The two chambers 85 and 86 after having been filled with fluid and adjusted to suitable pressure values then constitute equal fluid columns which resonate, if they are made a suitable length, while the fluid columns 85 and 86 centrally support the loaded floating piston 76.

To obtain a suitable length for a resonant condition in relation to the frequency of vibration of the fluid columns in the chambers 85 and 86, the piston 50 and the piston 66 are each advanced or retracted like distances toward or away from the longitudinal center of the cylinder 10 until the maximum vibration is created which will be the condition of resonance. This is done while suitable pressures are maintained to keep the floating piston 76 in a longitudinal central position by means of the supply tube valves 96 and 97. Maintaining the floating piston 76 in a longitudinal central position keeps the chambers 85 and 86 of equal length, thereby permitting the fluids contained in chambers 85 and 86 to remain equal so that they may vibrate in resonance because the vibrating loaded piston 76 is supported between the two equal liquid columns.

The pistons 50 and 66 may each be advanced or retracted toward or away from the center in unison by turning nuts 42 and 60 by means of the worms 105 and 106 which may be made to act in opposite directions in unison by the preferred but optional common drive 107.

Downward movement of rod 77, piston 76 and rod 78, due to movement of the surface 80 by the vibration exciter, is checked by means of the valve 98 which is actuated by the extension 82 of the piston rod 78. Actuation of the valve 98 feeds fluid through tube 90, valve 93 and port 75 to the lower cylinder chamber 86, thereby returning the floating piston 76 to its longitudinal central position in the cylinder.

Loss of fluid from the cylinder chambers 85 and 86 into tubes 89 and 90 respectively is prevented by the check valves 92 and 93 respectively. An increased pressure in one of the chambers for example chamber 85, due to a slight upward movement of the floating piston 76 which shortens that particular chamber, causes the ball in the corresponding check valve 92 to seat tightly on its valve seat located on the fluid supply side of the valve. When the pressure is slightly reduced in the same chamber 85, due to a slight downward movement of the floating piston 76 which lengthens the chamber 85, the ball in the same corresponding check valve 92 does not seat tightly on the supply side of the valve seat and the pressure in the particular chamber is maintained by fluid from the respective supply tube 89 as it is controlled by its pressure regulator valve 96. The pressure in chamber 86 is maintained in a similar manner by the check valve 93 and the pressure regulator valve 97.

The limit valve 98 of the floating piston 76 and each of the pressure regulator valves and the check valves operate in the manner described above and the position of the floating piston 76 is thereby maintained to within a few thousandths of an inch of a longitudinal central position in cylinder 10. The proper pressures are thereby maintained in chambers 85 and 86 and leakage around the piston and rods is returned to the sump 87 by the tubes 91, 100 and 102.

When the fluid columns of chambers 85 and 86 are vibrating, the balls in valves 92 and 93 vibrate at a small amplitude in unison with the pressure waves created in the fluid columns due to slight movement of the floating piston 76.

As previously explained, the length of the two fluid columns, contained in chambers 85 and 86, are always kept at a length substantially equal to each other and the end pistons 50 and 66 may be set at different positions at which the fluid columns are of equal length. Resonant frequency of the device is dependent on the particular length chosen for the fluid columns; and will be selected to correspond with the frequency of the vibration exciter.

Different length columns have an effect similar to varying the constant of a spring in accordance with the well known equations, $k = E/L = (f/3.13)^2 W$; where $E$ is the bulk modulus of compression of a fluid, $L$ is length of a column in inches, $f$ is frequency of pressure waves in the column in cycles per second and $W$ is the pounds of load per square inch of effective piston area. From the above equation the length $L$ can be calculated for any fluid, for example water having a bulk modulus of compression of 300,000 when, for example, the load is to be 200 pounds per square inch of effective piston area and the desired resonant frequency in a fatigue test is 30 cycles per second. Similarly for the same loading and the same fluid a different length may be calculated when a different resonant frequency is desired. For example, at 30 cycles per second the length would be 16.33 inches and at 300 cycles per second the length would be 0.1633 inch. The limits of the adjustable length of a cylinder design may thus be calculated for a certain desired frequency range when a cylinder of a particular cross section and a maximum desired load are known.

It will be recognized that my invention possesses many advantages.

The resonant frequency of the support mechanism of this invention may have a wide range because of the unique design whereby the resonant frequency may be easily changed.

The ease of setting to a resonant frequency makes the support structure of this invention adaptable to a wide range of loads.

For a particular given load the resonant frequency may be easily changed from time to time while the structure is loaded. This provides a means of testing a given load at different frequencies without the time and expense, of changing from one to the other of numerous non-adjustable support mechanisms, or changing an adjustment of an adjustable support mechanism which is unwieldy, expensive and cannot be readily set at every frequency within a wide range of resonant frequencies. The adjustability of resonant frequency of the present support mechanism under load is convenient, fast and adapted to every frequency within a wide range.

Although but one embodiment of the invention has been shown and described in detail it will be understood that changes may be made in the precise form and dimensions of the parts without departing from the spirit of the invention.

What is claimed is:

1. A resonant vibratory support system comprising a vertically disposed cylinder, a piston movable in the cylinder, a platform outside the cylinder and attached to the piston, a pair of movable heads closing the cylinder on both sides of the piston, means for moving said heads toward and away from the piston, and means for supplying fluid under pressure to the cylinder on both sides of said piston whereby a vibratory force applied to the piston causes said fluid and said platform to vibrate at a natural period of resonance dependent on the distance of said heads from said piston.

2. Apparatus according to claim 1 in which said heads are substantially equidistant from the piston.

3. A resonant vibration support system comprising a vertically disposed cylinder, a pair of movable heads slidable toward and away from each other and covering both ends of the cylinder, an opening through at least one of said heads having an axis colinear with the axis of the cylinder, a piston in the cylinder between the heads, rod means attached to the piston and extending colinear with said axes and through said hole in the piston head, a platform attached to the rod outside the cylinder, means for supplying fluid under pressure to the cylinder on both sides of said piston to maintain the piston floating between the two heads, and means for adjusting the distance of the two heads from the piston to produce a fluid column which is in resonance with a vibration applied to the piston.

4. Apparatus according to claim 3 in which threaded means are attached to said heads and an adjusting nut is applied engaging each of said threaded means to adjust the position of the heads relative to the piston.

5. Apparatus according to claim 3 in which a support structure supports, in a position adjacent to said cylinder, said means for adjusting said heads.

6. A resonant vibration support system comprising a vertically disposed cylinder, a pair of movable heads one above the other, slidable toward and away from each other and covering both ends of the cylinder, an opening through at least one of said heads having an axis colinear with the axis of the cylinder, a piston in the cylinder between the heads, rod means attached to the piston and extending colinear with said axes and through said hole in the piston head, a platform attached to the rod outside the cylinder, means for supplying fluid under pressure to the cylinder on both sides of said piston to maintain the piston floating between the two heads, means responsive to a charge of position of said piston from an equi-distance position between the two heads to a position closer to the lower head than to the upper head, said responsive means being operatively connected with said means for supplying fluid to control said last-mentioned means, and means for adjusting the distance of the two heads from the piston to produce a fluid column which is in resonance with a vibration applied to the piston; whereby said means responsive to a change of the piston position controls the supply of fluid provided by said means for supplying fluid thereby maintaining said piston floating between the two heads substantially equi-distant from each of said heads.

7. A resonant vibration support system comprising a vertically disposed cylinder, a pair of movable heads slidable toward and away from each other and covering both ends of the cylinder, an opening through at least one of said heads having an axis colinear with the axis of the cylinder, a piston in the cylinder between the heads, rod means attached to the piston and extending colinear with said axes and through said hole in the piston head, a platform attached to the rod outside the cylinder, means for supplying fluid under pressure to the cylinder on both sides of said piston to maintain the piston floating between the two heads, check valve means in said fluid supplying means, and means for adjusting the distance of the two heads from the piston to produce a fluid column which is in resonance with a vibration applied to the piston, whereby said check valve means vibrates with said vibrating piston and resonant fluid column and said check valve means close to the pressure of the fluid supplying means during the times of increased surge of pressure in the resonating liquid column and said check valve means open to the pressure of the fluid supplying means during the times of reduction of pressure in the resonating liquid column and thereby compensate for any loss of pressure by leakage around the free floating piston or around the rods during the periods of time in which said check valve means are open.

8. A resonant vibration support system comprising a vertically disposed cylinder, a pair of movable heads one above the other, slidable toward and away from each other and covering both ends of the cylinder, and opening through each of said heads, each of said openings having an axis colinear with the axis of the cylinder, a piston in the cylinder between the heads, rod means attached to each side of the piston and extending colinear with said axes and through each of said openings in the piston heads, a platform attached to the rod means extending outside the cylinder through the opening in one of said movable heads, means for supplying fluid under pressure to the cylinder on both sides of said piston to maintain the piston floating between the two heads, means for adjusting the distance of the two heads from the piston to produce a fluid column which is in resonance with a vibration applied to the piston, and a control valve in mechanical communication with the rod means extending outside the cylinder through the opening in the other of said movable heads, said control valve being located in said means for supplying fluid; whereby a change of position of said piston from an equi-distant position between the two heads to a position closer to the lower head than the upper head opens said control valve in said means for supplying fluid and an increased supply of fluid under pressure thereby returns said piston to a position between the two heads substantially equi-distant from each of said heads and then with the piston again in a central position said control valve closes.

References Cited in the file of this patent

UNITED STATES PATENTS 2,686,427     Ellett et al. _____ Aug. 17, 1954